United States Patent
Hao et al.

(10) Patent No.: US 8,120,618 B2
(45) Date of Patent: Feb. 21, 2012

(54) SYSTEM AND METHOD FOR VISUALIZATION OF OBJECTS USING ENERGY MINIMIZATION OF CUSTOMIZED POTENTIAL FUNCTIONS

(75) Inventors: Ming C. Hao, Palo Alto, CA (US);
Umeshwar Dayal, Saratoga, CA (US);
Meichun Hsu, Los Altos Hills, CA (US);
Thomas Holenstein, Zurich (CH);
Markus Gross, Uster (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 1917 days.

(21) Appl. No.: 10/170,062

(22) Filed: Jun. 11, 2002

(65) Prior Publication Data
US 2003/0227484 A1    Dec. 11, 2003

(51) Int. Cl.
*G09G 5/00* (2006.01)

(52) U.S. Cl. .................................................. 345/619

(58) Field of Classification Search .............. 345/667, 345/427, 677, 619; 382/293–295; 715/517, 715/518, 521
See application file for complete search history.

(56) References Cited

U.S. PATENT DOCUMENTS

| | | | |
|---|---|---|---|
| 5,627,949 A * | 5/1997 | Letcher, Jr. | 345/420 |
| 5,930,784 A * | 7/1999 | Hendrickson | 707/2 |
| 5,987,470 A * | 11/1999 | Meyers et al. | 707/102 |
| 6,037,949 A * | 3/2000 | DeRose et al. | 345/582 |
| 6,323,879 B1 * | 11/2001 | Sauerbrei | 345/672 |
| 6,389,418 B1 * | 5/2002 | Boyack et al. | 707/6 |
| 6,417,865 B1 * | 7/2002 | Bou | 345/619 |
| 6,453,246 B1 * | 9/2002 | Agrafiotis et al. | 702/27 |
| 6,631,202 B2 * | 10/2003 | Hale | 382/128 |
| 6,728,728 B2 * | 4/2004 | Spiegler et al. | 707/103 R |
| 6,990,628 B1 * | 1/2006 | Palmer et al. | 715/500 |
| 2002/0087426 A1 * | 7/2002 | Shiitani et al. | 705/26 |
| 2002/0196292 A1 * | 12/2002 | Itoh et al. | 345/853 |

FOREIGN PATENT DOCUMENTS

JP    10-207907 A  *  8/1998

* cited by examiner

*Primary Examiner* — Daniel Washburn (57) ABSTRACT

The present invention, an object display system, provides a system and method for positioning objects on a viewing area. One embodiment can be viewed as providing a method comprising the steps of specifying a plurality of objects, specifying a plurality of object pairs from the plurality of objects, specifying a potential function for each one of the specified object pairs, specifying a similarity value (s) for each one of the specified object pairs, determining an energy (e) for each one of the potential functions and solving for the minimum total energy (E) of the plurality of potential functions such that a distance (r) between each of the specified object pairs is determined.

10 Claims, 4 Drawing Sheets

SYSTEM AND METHOD FOR VISUALIZATION OF OBJECTS USING ENERGY MINIMIZATION OF CUSTOMIZED POTENTIAL FUNCTIONS

BACKGROUND OF THE INVENTION

1. Field of the Invention

The present invention generally relates to displaying objects and, in particular, to a system and method for determining the relative position of a plurality of objects in two-dimensional or three-dimensional space.

2. Related Art

Placement of objects on a display screen in a visually pleasing manner and based upon logical relationships is desirable. For example, in a virtual shopping mart accessible via the Internet, a visitor views product images and related information. Included with the product may be a textual description and/or a uniform resource locator (URL) that will change the display to a more detailed view and/or more detailed information of the product if selected by the visitor. It is very desirable to include images of multiple products on a single viewing page. Accordingly, a product line may be presented to a visitor such that the visitor may view and/or purchase related products of interest by placing an order.

Thus, the placement of a plurality objects on the display screen (company logos, product images, textual information, animations, URLs, etc.) is important for many reasons. For example, consider a virtual bookstore where a visitor purchase books. A visually pleasing presentation of objects may induce the visitor to purchase products and return to the site at a later time. Grouping related objects improves the efficiency of the shopping effort and allows the display of the products in a more logical manner (e.g.: displaying science fiction books together, and displaying mystery books together). Grouping related, but different products may induce the visitor to buy the related products (e.g.: books on coin collecting, magazines on coin prices and coin display cases). One skilled in the art will appreciate that the various strategies in grouping products in a virtual mart are limitless. Furthermore, a virtual mart is merely one non-limiting example where placement of objects on a viewing page is of interest.

Objects may be displayed on a viewing page in two-dimensional or three-dimensional space. Typically, similar objects are placed into spatial positions close to each other. The spatial separation of objects is a function of the relative degree of similarity between the objects. For example, two science fiction books may be very related (high degree of similarity), and would be placed in proximity to each other. Alternatively, a science fiction book and a mystery book may be, in some situations, unrelated objects (low degree of similarity) that are placed far away from each other, such as on different viewing pages.

Object positioning may be based upon similarities between the objects. Object placement may be effected on a manual, ad-hoc basis where an individual determines placement of the objects. However, such placement is time consuming and requires a high degree of concentration, particularly if there are many objects.

Another object placement technique employs numerically specified similarity between two objects using a number between 0 and 1. (Alternatively, object positioning may be based upon dissimilarities between the objects.) Thus, position of one object may be specified on the viewing page, and placement of related objects may be automated based upon defined similarities. For example, if a science fiction book is to be marketed by the virtual market, an image of the science fiction book may be selected for display. The position of the image of the science fiction book may be specified. Text describing the science fiction book, and/or a URL associated with the science fiction book and other objects, would have a high degree of similarity, and thus be automatically positioned nearby the image of the science fiction book. Conversely, the mystery book would have a low degree of similarity with the science fiction book, and accordingly, an image of the mystery book would be placed farther from the image of the science fiction book if the mystery book is displayed on the viewing page.

Some object placement applications employ ad-hoc mass-spring modeling methods. Springs coupling object pairs represent similarity between the objects, with a spring stiffness corresponding to the degree of similarity. Spring stiffness may be referred to as a constraint. Object mass also relates to relative similarity between objects. Once spring constants and object masses are specified, a mathematical model is developed, typically in the form of a matrix.

Placing an object on the viewing page, or repositioning an object on the viewing page, causes a repositioning of all of the objects in the viewing page in accordance with the mathematical mass-spring model. Accordingly, a light object coupled to the moved object with stiff spring (high degree of similarity) will move closely with the moved object. On the other hand, a heavy object coupled to the moved object with a weak spring (low degree of similarity) may move very little (if at all). Thus, the object masses and the springs between objects define the positioning of the objects relative to each other.

However, depending on the implementation of the object positioning model, various problems may be encountered.

1. Penetration and collision of similar data objects during visualization: Objects may be positioned so close, or even over each other, so as to not be visually pleasing to a viewer.
2. Visual cluttering and overlap for very large transaction datasets: Groups of objects may be clustered onto regions of the viewing screen, thereby leaving unused regions of the viewing screen.
3. Limitation of the degrees of freedom of an object by adding springs for the representation of object relations: Computational algorithms used to compute object positions in a mass-spring model may limit the number of related objects that a single object can be related to.
4. Mass spring setting is restricted with respect to the numerical solution strategies: The computational algorithm used to compute object positions may place numerical limitations on the permissible values of spring constants and masses.
5. Sensitivity of the layout against initialization: Computational limitations create a vulnerability to local minimum configurations.

Thus, a heretofore unaddressed need exists in the industry for providing a system and method of enabling placement of objets on a display area in a quick, efficient and effective manner.

SUMMARY OF THE INVENTION

The present invention, an object display system, provides a system and method for positioning objects on a viewing area. One embodiment can be viewed as providing a method comprising the steps of specifying a plurality of objects, specifying a plurality of object pairs from the plurality of objects, specifying a potential function for each one of the specified object pairs, specifying a similarity value (s) for each one of the specified object pairs, determining an energy (e) for each one of the potential functions and solving for the minimum total energy (E) of the plurality of potential functions such that a distance (r) between each of the specified object pairs is determined.

BRIEF DESCRIPTION OF THE DRAWINGS

The components in the drawings are not necessarily to scale relative to each other. Like reference numerals designate corresponding parts throughout the several views.

DETAILED DESCRIPTION

The present invention provides a system and method for determining the relative position of a plurality of objects in two-dimensional or three-dimensional space. A preferred embodiment minimizes the total energy of a plurality of potential functions, as described below, to determine object positions. Examples of objects include, but are not limited to, company logos, images, product images, textual information, animations, URLs, etc.

Figure 1:
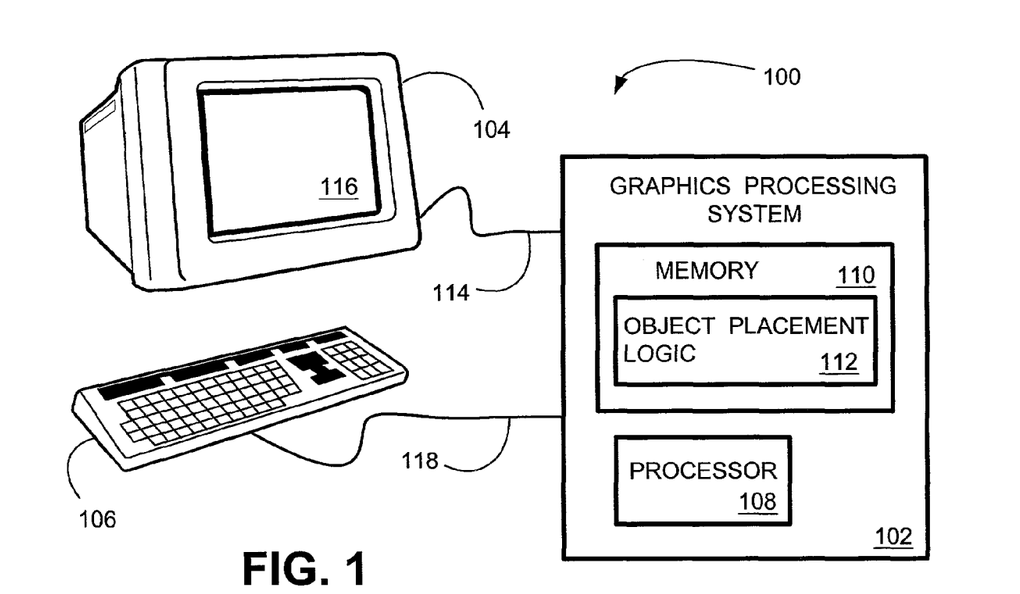
FIG. 1 is a block diagram illustrating selected components of an embodiment of an object display system.

FIG. 1 is a block diagram illustrating selected components of an embodiment of an object display system 100. Object display system 100 includes at least a graphics processing system 102, a display device 104 and a user interface 106. Graphics processing system includes at least a processor 108 and a memory 110, in which object placement logic 112 resides.

As objects are positioned by the object display system 100, an image having the positioned objects is communicated to display device 104, via connection 114, and displayed on display 116. For convenience, display device 104 is illustrated as a cathode ray tube (CRT) monitor employing a CRT for the display 116. It is understood that other embodiments of the object display system 100 can be implemented in suitable display device having a display for viewing objects. Further, the image may be communicated to a printing device for printing.

For convenience, user interface 106 is illustrated as a keyboard, coupled to graphics system processing system 102 via connection 118. It is understood that other embodiments of the object display system 100 can be implemented using other suitable user interface devices and/or connections configured to receive object positioning instructions from a user such that a plurality of objects are positioned on a viewing area and displayed on display 116 in accordance with the present invention.

Figure 2:
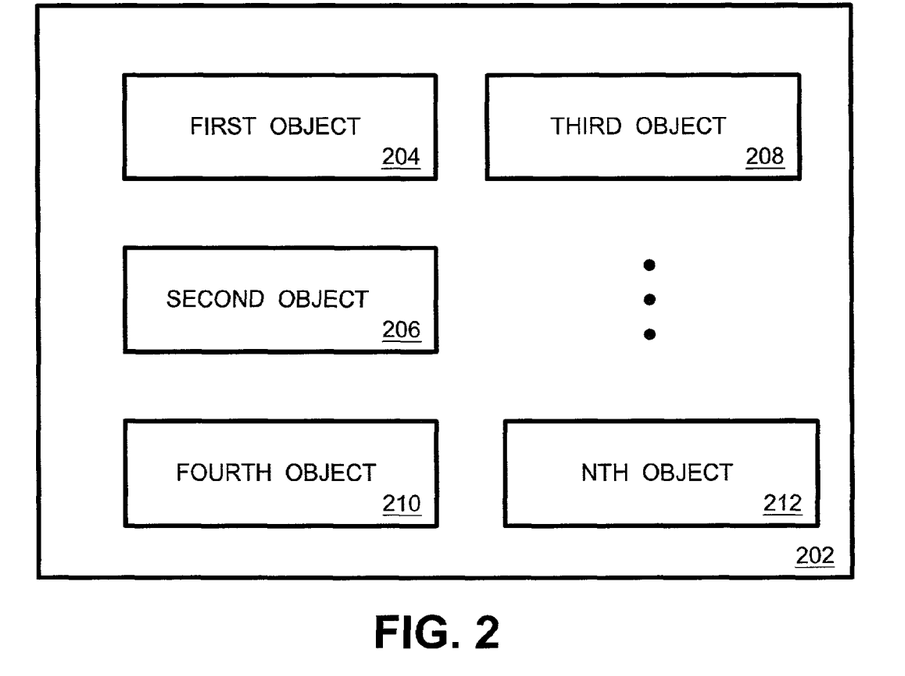
FIG. 2 is a block diagram illustrating an exemplary placement of a plurality of objects on a viewing area as determined by an embodiment of the object display system.

FIG. 2 is a block diagram illustrating an exemplary placement of a plurality of objects on a viewing area 202 as determined by an embodiment of the object display system 100. Viewing area 202 is a portion of a viewing displayed on display 116. FIG. 2 is intended as a simplified exemplary illustration of the placement of five generic objects within viewing area 202. It is understood that the object display system 100 is configured to determine the position of any suitable number of objects on the viewing area 202, as described herein. Viewing area 202 may be configured as a two-dimensional region, or as a perspective view of a three-dimensional region.

When the object display system is operated to position a plurality of objects on a viewing area 202, the processor 108 retrieves and executes the object placement logic 112. Graphics processing system 102 may include any suitable processor configured to execute the object placement logic 112. Furthermore, the graphics processing system 102 may be a special purpose processing device configured to position objects as determined by an embodiment of the object display system 100. Or, graphics processing system 102 may be any general purpose processing system, such as a personal computer, configured to position objects on a viewing area 202, as determined by an embodiment of the object display system 100, as well as being configured to perform other tasks unrelated to the object display system 100.

Object display system 100 has determined the position of the first object 204 based upon an initial condition. Preferably, the initial condition is specified by a user or by another suitable predefined criteria. Here, for illustration purposes, first object 204 is positioned in the upper left-hand corner of viewing area 202.

In the simplified illustrative example of FIG. 2, it is assumed that second object 206 and third object 208 are similar to first object 204. That is, the first object 204 and the second object 206 have a relatively high degree of similarity. Also, the first object 204 and the third object 208 have a relatively high degree of similarity. Accordingly, the object display system 100 has determined that the second object 206 and the third object 208 are to be positioned adjacent to the first object 204. The determination of the position of objects by the object display system 100 is described in greater detail below.

The fourth object 210 is placed further away from first object 210, indicating that the degree of similarity between fourth object 210 and first object 204 is less than the similarity of the second object 206 and the first object 204. Furthermore, it is assumed that the degree of similarity between fourth object 210 and first object 204 is less than the similarity of the third object 208 and the first object 204.

The Nth object 212 is placed even further away from the first object 204, indicating that the degree of similarity between Nth object 212 and first object 204 is less than the similarity of the second object 206 and the first object 204, less than the similarity of the third object 208 and the first object 204, and less than the similarity of the fourth object 210 and the first object 204.

The above-described simplified example assumes that four object pairs, and associated similarities are defined (first object 204 and second object 206; first object 204 and third object 208; first object 204 and fourth object 210; and first object 204 and Nth object 212). Similarities between the objects of each pair, described below, are specified prior to the positioning of the object by the object display system 100. Furthermore, the distance between each object of an object pair is known.

It is understood that any number of objects may be selected for positioning by the object display system 100 and for display on viewing area 202. For example, in the simplified illustration example of FIG. 2, a similarity between the second object 206 and the third object 208 may be specified to further control the positioning of the second object 206 and the third object 208, relative to each other. Furthermore, it is understood that similarities between any pair of objects may be optionally defined depending upon the particular object positioning objectives of the user.

For each object pair, a potential function describing the energy (e) as a function of similarity (s) and distance between the two objects (r) is defined. Thus, a potential function for each object pair is defined.

$$e = e(r,s) \qquad \text{(equation 1)}$$

Objects are placed in the viewing area 202 and the distances r for each object pair are determined. The total energy E is then determined by summing the individual energies for the object pairs, where $r_{i,j}$ is the distance between an $i^{th}$ object and a $j^{th}$ object, and $s_{i,j}$ is the similarity between the $i^{th}$ object and the $h^{th}$ object. Accordingly, the total energy is expressed as:

$$E = \Sigma e(r_{i,j}, s_{i,j}) \qquad \text{(equation 2)}$$

The present invention defines the optimal configuration of the object positions on the viewing area 202 when the above-described total energy is minimized.

One embodiment of the object display system 100 defines the potential function for an object pair by equation 3 below:

$$e(r,s) = a/r + bsr^2 + cr \qquad \text{(equation 3)}$$

The term a/r in equation 3 prevents object collision (also know as object penetration), where the term a is a predefined constant. In one embodiment, a is specified by the user. Accordingly, as two objects approach each other, the term a/r increases, thereby maintaining a minimum separation between the two objects.

The term $bsr^2$ in equation 3 controls the attraction of objects in an object pair as a function of their similarity, where the term b is a predefined constant specified by the user. Accordingly, two object having a high degree of similarity s are more strongly attracted to each other as compared to two objects having a lesser degree of similarity. Furthermore, as the distance r decreases when the objects are positioned closer together, the energy e (r, s) associated with the object pair decreases.

The term cr in equation 3 prevents an infinite distance between two objects, where the term c is a predefined constant. The term c is typically very small. In one embodiment, c is specified by the user. Accordingly, an object will remain within the defined viewing area 202.

Other embodiments employ energy functions modeled with higher order equations. However, such higher order models are more complex to define and solve. Thus, the embodiment employing the second order model of equation 3 is easily defined and solved, and furthermore, a second order equation has one minimum.

Figure 3:
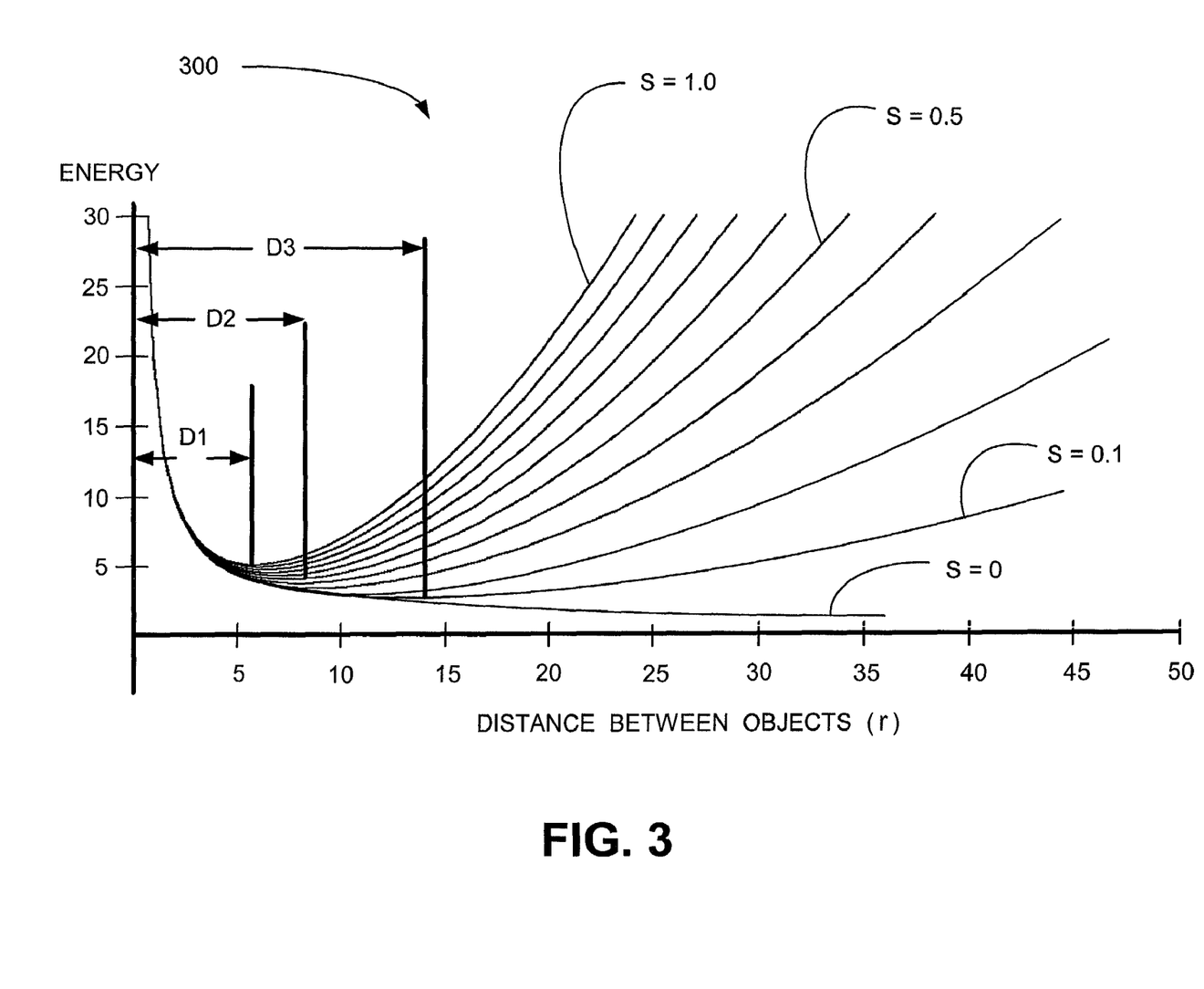
FIG. 3 is a simplified illustrative graph of a potential function according to an embodiment of the present invention for various similarity values.

FIG. 3 is a simplified illustrative graph of a potential function according to equation 3 for various similarity values (ranging from 0.0 to 1.0). The vertical axis represents the energy associated with an object pair according to equation 3. It is understood that since the graph 300 is a simplified example, the energy units are arbitrary values (without units) selected to demonstrate the principal of the present invention. Similarly, the horizontal axis represents the distance r (without units) between objects of an object pair according to equation 3. It is understood that since the graph 300 is a simplified example, the distance units are arbitrary values selected to demonstrate the principal of the present invention.

For each of the curves of graph 300, the present invention defines the optimal distance between two objects of an object pair when the potential function (energy) is minimized. Thus, the optimal distance between two objects is found at the lowest point on each curve.

As illustrated in graph 300, the distance D1 corresponds to a graph line where the similarity equals one (S=1.0). Distance D1 is approximately 6 units on the distance axis. The distance D2, approximately equaling 8 units on the distance axis, corresponds to a graph line where the similarity equals 0.5. Accordingly, the differences between D1 and D2, corresponding to similarities of 1.0 and 0.5, respectively, indicates that the objects would be positioned further apart as the similarity between the objects is decreased.

The distance D3, approximately equaling 14 units on the distance axis, corresponds to a graph line where the similarity equals 0.1. Thus, the objects are positioned even further apart in accordance with the present invention.

Figure 4A:
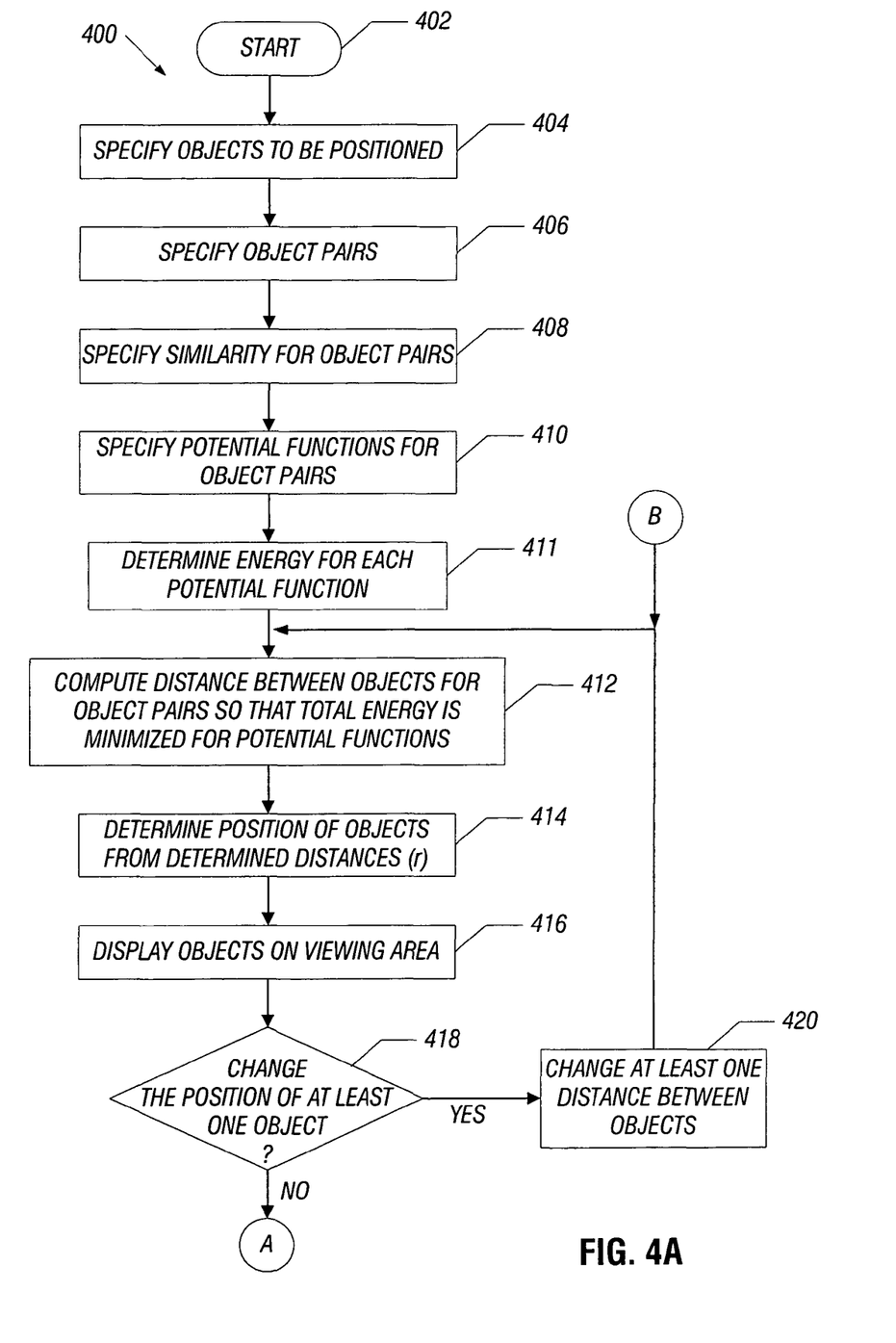
FIGS. 4A and 4B illustrate a flow chart of a process for determining placement of objects on a viewing area by an embodiment of the object display system.
Figure 4B:
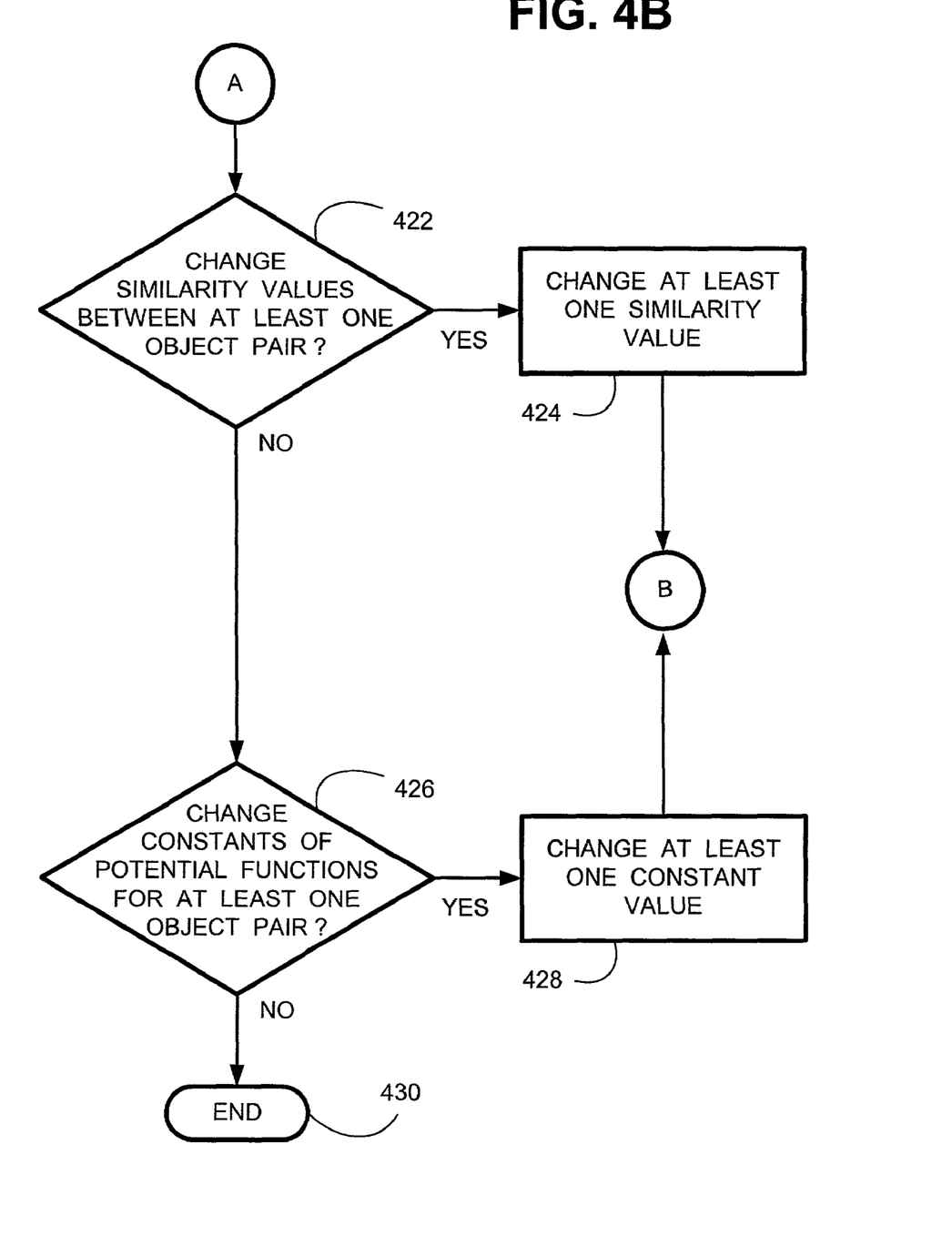

FIGS. 4A and 4B illustrate a flow chart 400 of a process for determining placement of objects on a viewing area 202 by an embodiment of the object display system 100. The flow chart 400 shows the architecture, functionality, and operation of a possible implementation of the software for implementing the object placement logic 112 (FIG. 1). In this regard, each block may represent a module, segment, or portion of code, which comprises one or more executable instructions for implementing the specified logical function(s). It should also be noted that in some alternative implementations, the functions noted in the blocks may occur out of the order noted in FIGS. 4A and 4B or may include additional functions without departing significantly from the functionality of the object display system 100. For example two blocks shown in succession in FIGS. 4A and 4B may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure for the object display system 100 and to be protected by the accompanying claims.

The process of positioning objects on viewing area 202 (FIG. 2) starts at block 402. At block 404 a specification is received which identifies the objects that are to be positioned on the viewing area 202. At block 406 object pairs are specified.

At block 408 the similarities are specified for object pairs. At block 410 potential functions are specified for the object pairs in accordance with equation 3. Thus, in one embodiment, constants a, b and c are specified based upon the particular desires of the user. The equations are preferably assembled into a matrix such that the minimum energies of the potential functions may be solved using a suitable numerical algorithm.

At block 411, an energy for each one of the potential functions is determined. At block 412 the distance between objects, r, is computed in accordance with the present invention such that the total energy of the plurality of potential functions are minimized.

At block 414 the positions of the specified objects on the viewing area 202 is determined. At block 416 the objects are displayed on display 116 (FIG. 1). The viewer determines (at block 418) if an object position is to be changed. If so (the YES condition), the process proceeds to block 420 where the positioning of a selected object is changed, thereby changing the distance between at least one object pair. The process then returns to block 412. If at block 418 the viewer does not wish to change the position of an object (the NO Condition), the process proceed to block 422.

At block 422 a determination is made whether the viewer desires to change the similarity values for any of the object pairs. For example, the viewer may determine that two objects are more closely related (and thereby be more closely positioned together), and thereby decide to increase the similarity value for the object pair. If a similarity value is to be changed (the YES condition), the process proceed to block 424 such that a similarity value is changed. The process then returns to block 412 and the process continues as described above. However, intervention by the viewer is not necessarily required.

If at block 422 a similarity value is not changed (the NO condition), the process proceeds to block 426. At block 426 a determination is made to change one of the constants (a, b and/or c) of a potential function for an object pair. At block 428, at least one constant value is changed, and the process returns to block 412 and the process continues as described above.

If at block 426 the user is satisfied with the placements of the objects on the viewing area 202 (the NO condition), the process proceeds to block 430 and ends. That is, the process ends when the displayed image is visually pleasing.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A method for positioning objects on a viewing area, the method comprising the steps of:
   specifying a plurality of objects;
   specifying a plurality of object pairs from the plurality of objects;
   specifying a potential function for each one of the specified plurality of object pairs;
   specifying a similarity value (s) for each one of the specified object pairs;
   determining an energy (e) for each one of the potential functions;
   solving for a minimum total energy (E) of the plurality of potential functions such that a distance (r) between objects in each of the specified object pairs is determined;
   specifying a first constant (a) for each potential function;
   specifying a second constant (b) for each potential function;
   specifying a third constant (c) for each potential function;
   wherein each one of the potential functions defining the energy (e) of each one of the specified object pairs is specified by $$e(r,s)=a/r+bsr^2+cr$$

and wherein E is determined by summing the determined energies of each one of the specified object pairs; and
   outputting the plurality of objects for display on a display device according to the determined distances.

2. The method of claim 1, further comprising the step of preventing collision of the objects of a specified object pair by determining a value of the first constant of the potential function for that object pair.

3. The method of claim 1, further comprising the step of keeping an object within the viewing area by determining a value of the third constant of the potential function for that object pair.

4. The method of claim 1, further comprising the steps of:
   specifying a new first constant for at least one of the potential functions; and
   recomputing E based upon the change of e caused by the new first constant.

5. The method of claim 1, further comprising the steps of:
   specifying a new second constant for at least one of the potential functions; and
   recomputing E based upon the change of e caused by the new second constant.

6. The method of claim 1, further comprising the steps of:
   specifying a new third constant for at least one of the potential functions; and
   recomputing E based upon the change of e caused by the new third constant.

7. A system which positions objects on a viewing area, comprising:
   a processing system configured to determine position of a plurality of objects;
   a memory residing in the processing system; and
   logic residing in the memory, the logic configured to perform:
      receiving a specification of a plurality of objects;
      receiving a specification of a plurality of object pairs from the plurality of objects;
      receiving a specification of a potential function for each one of the specified object pairs;
      receiving a specification of a similarity value (s) for each one of the specified object pairs;
      determining an energy (e) for each one of the potential functions; and
      solving for a minimum total energy (E) of the plurality of potential functions such that a distance (r) between objects in each of the specified object pairs is determined;
      receiving the specification of a first constant (a) for each potential function;
      receiving the specification of a second constant (b) for each potential function; and
      receiving the specification of a third constant (c) for each potential function;
      wherein each one of the potential functions defining the energy (e) of each one of the specified object pairs is specified by $$e(r,s)=a/r+bsr^2+cr$$

and wherein E is determined by summing the determined energies of each one of the specified object pairs; and
   wherein the processing system is configured to provide the plurality of objects for display on a display device according to the determined distances.

8. A system for positioning objects on a viewing area, comprising:
   means for specifying a plurality of objects;
   means for specifying a plurality of object pairs from the plurality of objects;
   means for specifying a potential function for each one of the specified object pairs;
   means for specifying a similarity value (s) for each one of the specified object pairs, wherein the similarity value (s) for each object pair represents relative similarity of the objects in the object pair;
   means for determining an energy (e) for each one of the potential functions;
   means for solving for the minimum total energy (E) of the plurality of potential functions such that a distance (r)

between objects in each of the specified object pairs is determined, the total energy (E) being based on the determined energies;

means for specifying a first constant (a) for each potential function;

means for specifying a second constant (b) for each potential function;

means for specifying a third constant (c) for each potential function;

wherein each one of the potential functions defining the energy (e) of each one of the specified object pairs is specified by $$e(r,s)=a/r+bsr^2+cr,$$

and wherein E is determined by summing the determined energies of each one of the specified object pairs; and means for outputting the plurality of objects for display on a display device according to the determined distances.

9. The system of claim 8, further comprising:

means for repositioning at least one of the objects such that a corresponding r is changed; and means for recomputing E based upon the changed r.

10. The system of claim 8, further comprising:

means for receiving a new similarity value for at least one of the specified object pairs; and means for recomputing E based upon the new similarity value.

* * * * *

UNITED STATES PATENT AND TRADEMARK OFFICE
CERTIFICATE OF CORRECTION

PATENT NO. : 8,120,618 B2
APPLICATION NO. : 10/170062
DATED : February 21, 2012
INVENTOR(S) : Ming C. Hao et al.

Page 1 of 1

It is certified that error appears in the above-identified patent and that said Letters Patent is hereby corrected as shown below:

In column 9, line 13, in Claim 8, delete "$e(r,s)=a/r+bsr^2+cr$," and insert -- $c(r,s)=a/r+bsr^2+cr$ --, therefor.

Signed and Sealed this
Sixth Day of November, 2012

David J. Kappos
*Director of the United States Patent and Trademark Office*